United States Patent [19]

Hirasawa

[11] Patent Number: 5,048,866
[45] Date of Patent: Sep. 17, 1991

[54] SEAT BELT MOUNT MECHANISM

[75] Inventor: Kiyoshi Hirasawa, Hamamatsu, Japan

[73] Assignee: Suzuki Motor Company Limited, Shizuoka, Japan

[21] Appl. No.: 537,366

[22] Filed: Jun. 13, 1990

[30] Foreign Application Priority Data

Jun. 13, 1989 [JP] Japan .............................. 1-68733[U]

[51] Int. Cl.5 .............................................. B60R 21/10
[52] U.S. Cl. ..................................... 280/803; 280/808; 297/483
[58] Field of Search ....................... 280/801, 803, 808; 297/483, 488

[56] References Cited

U.S. PATENT DOCUMENTS

| | | | |
|---|---|---|---|
| 4,216,978 | 8/1980 | Mauron | 280/803 |
| 4,223,914 | 9/1980 | Usami et al. | 280/803 |
| 4,230,343 | 10/1980 | Takada | 280/803 |
| 4,483,553 | 11/1984 | Nogiwa et al. | 280/803 |
| 4,723,793 | 2/1988 | Kato et al. | 280/808 |

Primary Examiner—Kenneth R. Rice
Attorney, Agent, or Firm—McGlew & Tuttle

[57] ABSTRACT

This invention is directed to a useful improvement in a seat belt mount mechanism for use in an automotive vehicle of the type that an anchor plate adapted to support a shoulder anchor for holding the seat belt extending through an opening defined therein is mounted operatively to a door sash element of the vehicle body by way of a fixing bracket, wherein there is provided an elongated portion extending outwardly from the lower end of the anchor plate, upon which the elongated portion the shoulder anchor is held operatively, whereby it is feasible in practice to bring the mount for the shoulder anchor as far behind as possible of the door sash element, and consequently, the seat belt may serve more effectively in function to forcibly catch a driver or passengers therein. With this arrangement, it is possible in practice to make the anchor plate and the fixing bracket small and compact in construction, accordingly.

3 Claims, 2 Drawing Sheets

SEAT BELT MOUNT MECHANISM

FIELD OF THE INVENTION AND RELATED ART STATEMENT

The present invention relates generally to an improvement relating to a seat belt mount mechanism for use in an automotive vehicle, and more particularly to an improvement in the construction of a passive-type seat belt mount mechanism for presenting an excellent combined effect of ready-to-take.

Recently, it has been an increasing trend from the safety guard standpoint to oblige passengers to make use of a safety seat belt while in a seat in a travelling passenger car or automotive vehicle, and so under this situation, a variety of seat belts have been employed in the passenger cars on the market. However, mainly due to inconveniences or complexities in use of such seat belts, many drivers of passenger cars would rather spare themselves the trouble of making use of such seat belts. In coping with such an undesirable trend of vehicle drivers, there has been proposed as a useful countermeasure the employment of the so-called passive type seat belt, which is designed to automatically force a driver and passenger of a passenger car to have on a seat belt upon their sitting in a seat and upon the closing of a vehicle door. This passive type seat belt is generally of such a construction that a strip of seat belt is disposed extending transversely over a seat from behind the door sash to the center of a vehicle body in such a manner that a length of belt strip will be put forcibly around the chest of a driver or passenger from the moment that he or she sits into the vehicle's seat.

In addition, according to the typical arrangement of such a passive type seat belt, it is constructed in such a manner that an anchor plate which is adapted to rotatably support a shoulder belt anchor for holding a seat belt is mounted to a door sash of a vehicle body by way of a fixing bracket.

In practice, in such a typical conventional seat belt as noted above, it is notable that the mount of the shoulder belt anchor is arranged generally in a straightforward relationship with the mount of the anchor plate to the fixing bracket along the longitudinal axis of the vehicle body, and with this arrangement, it is of a general arrangement such that the shoulder belt anchor turns out to be substantially forward of the behind or rear portion of the door sash element.

Such a general arrangement is considered to be disadvantageous for the achievement of the required performance which is essential in the design of a seat belt.

OBJECT AND SUMMARY OF THE INVENTION

In an attempt to cope with such an undesired shortage in performance according to the conventional construction of a seat belt as noted above, the present invention is essentially directed to the provision of an improvement in construction to attain a due performance of a seat belt for an automotive vehicle.

This improvement in the seat belt mount mechanism for use in a vehicle in which an anchor plate adapted to support a shoulder belt anchor for holding a seat belt is mounted operatively to a door sash element through a fixing bracket may be attained from the provision of an arrangement such that there is provided an extension from the lower end of the anchor plate, upon which extension the shoulder anchor is supported operatively.

According to this improvement in the mount mechanism for a seat belt for use in an automotive vehicle, there may be attained such an advantageous construction that may effect a desired ready-to-take performance of a passive type safety seat belt without fail in use, thus serving well in the accomplishment of its due effect.

BRIEF DESCRIPTION OF THE DRAWINGS

In the accompanying drawings, like parts are designated by like reference numerals, and in which FIGS. 1 through 4 are a series of views showing a preferred embodiment of an improved seat belt mount mechanism according to the present invention; wherein FIG. 1 is a perspective general view showing the rear side of an automotive vehicle;

FIG. 2 is an enlarged fragmentary view showing main elements of the seat belt mount mechanism;

FIG. 3 is a general plan view showing an anchor plate in the seat belt mount mechanism according to the present invention; and FIG. 4 is a cross-sectional view taken along the line 20—20 in FIG. 3 showing the same anchor plate.

DETAILED DESCRIPTION OF A PREFERRED EMBODIMENT

Figure 1:
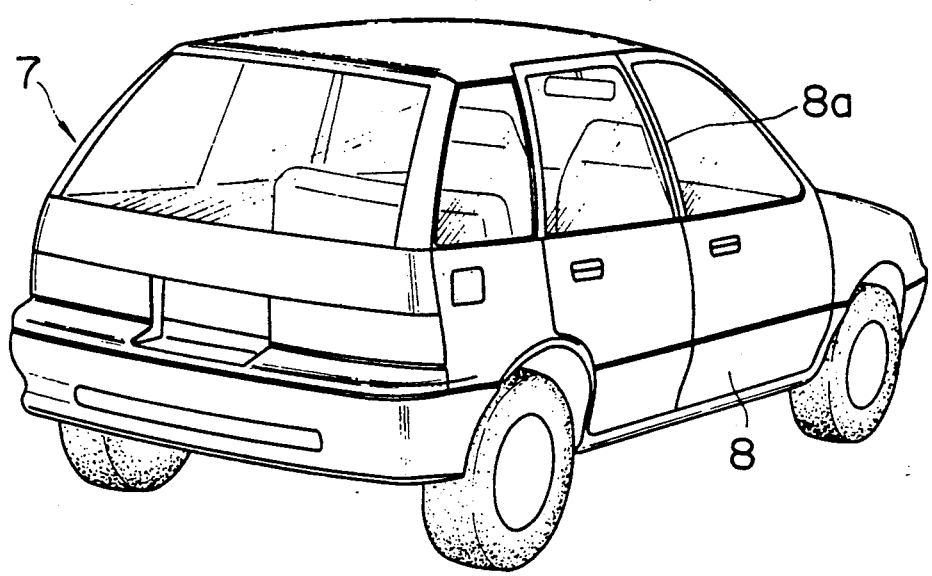
Figure 2:
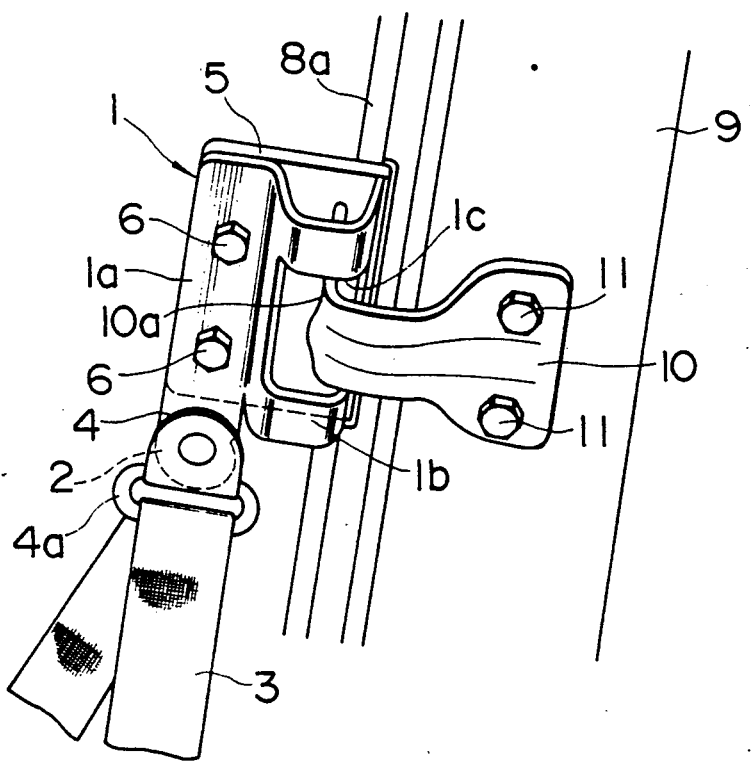

The present invention will now be described in detail by way of a preferred embodiment thereof taking reference to the accompanying drawings.

FIGS. 1 through 4 are a series of views showing a preferred embodiment of a seat belt mount mechanism according to the present invention.

The seat belt mount mechanism by way of this preferred embodiment is such that there are provided an extension 2 from the lower end of a base or web of an anchor plate 1, and a shoulder anchor 4 having a through ring 4a for mounting a strip of seat belt 3 and adapted to be held rotatably by the extension 2.

The anchor plate 1 is formed with an engagement 1b having a substantially U-shaped cross section extending rearwardly from the base 1a and having an opening 1c formed in the center thereof.

The anchor plate 1 is designed to be secured at the base 1a thereof to a fixing bracket 5 extending from a door sash element 8a by using securing screws 6, 6, and mounted in turn to the door sash element 8a behind a door of a vehicle 7 by way of the fixing bracket 5.

On the other hand, to the inside of a center pillar 9 of the vehicle 7, a shoulder bracket 10 having a claw 10a at its leading end is seen mounted securely by using screws 11, 11.

The claw 10a of the shoulder bracket 10 is adapted to be inserted constantly in an engagement position with the central opening 1c of the anchor plate 1, in the state that the door 8 is held closed.

Figure 3:
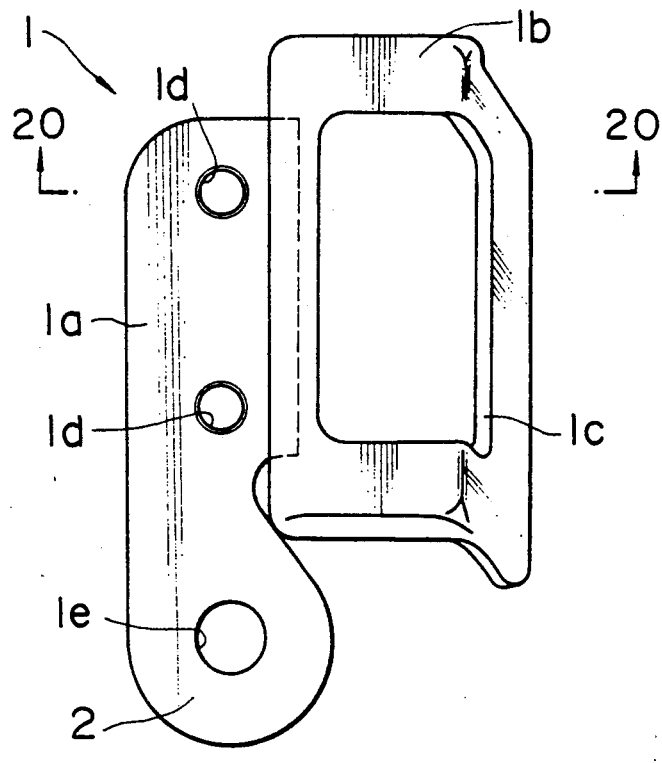
Figure 4:
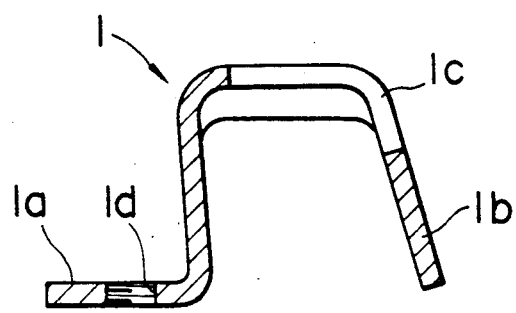

Now, referring to FIG. 3, there is generally shown the anchor plate 1, which is formed with openings 1d, 1d for receiving screws for the fixation of the anchor plate 1 to the fixing bracket 5, and an opening 1e for mounting the shoulder anchor 4 upon the anchor plate 1.

According to this embodiment of the invention, wherein the shoulder anchor 4 is mounted operatively on the extension 2 from the lower end of the anchor plate 1, it is feasible in practice to mount the shoulder anchor 4 in a desired position more behind or rearward than that of the conventional arrangement. With this arrangement, the seat belt 3 may serve more effectively in function to forcibly catch a driver or passengers therein.

Also, when there is rendered a substantial load upon the seat belt while in use, the opening 1c formed in the anchor plate 1 may be held positively by the claw 10a of the shoulder bracket 10, and consequently, the load may well be received by the center pillar 9 in addition by the door sash element 8a, accordingly.

Additionally, the anchor plate 1 and the fixing bracket 5 according to this embodiment are of such a design that the shoulder anchor 4 may be disposed in engagement at the bottom end thereof, thus making it small and compact in construction.

In connection with this arrangement, it is preferred that the screws 6, 6, 11 and 11 are covered on their heads with detachable caps, when the anchor plate 1 is secured to the fixing bracket 5 and the shoulder bracket 10 is mounted on the center pillar 9, respectively.

As stated fully hereinbefore, by virtue of the advantageous construction of the mount for the seat belt according to the present invention wherein the shoulder anchor holding the strip of the seat belt is mounted operatively in the extension from the lower end of the anchor plate, it is feasible in practice to bring the mount for the shoulder anchor as far behind the door sash as possible, and consequently, the seat belt may serve more effectively in function to forcibly catch a driver or passengers therein. With this arrangement, it is possible in practice to make the anchor plate and the fixing bracket small and compact in construction, accordingly.

Lastly, it is to be understood that the appended claim is intended to cover all of such generic and specific features as are particular to the invention as disclosed herein and all statements relating to the scope of the invention, which as a matter of language might be said to fall thereunder.

I claim:

1. A seat belt mount mechanism of a seat belt for use in an automotive vehicle, comprising a fixing bracket connected to a door sash element of a vehicle body; an anchor plate mounted to said door sash element by fixing means connecting said anchor plate to said fixing bracket, said anchor plate including an elongated portion extending outwardly from a lower end of said anchor plate; a shoulder belt anchor including an opening for holding a shoulder seat belt, said anchor plate including a base and an engagement portion having a substantially U-shaped cross section extending away from said base, said engagement portion of substantially U-shaped cross section having an opening formed in a center thereof; a shoulder belt support bracket secured on an interior side of the vehicle connected to a center pillar of said vehicle, said shoulder bracket having a portion extending into said opening when the door of the vehicle is closed.

2. A seat belt mount mechanism according to claim 1, wherein said shoulder belt bracket is formed having an L-shape and including a claw element at one end, said claw element extending into said opening for engagement with the anchor plate when the vehicle door is closed, said shoulder bracket being securely mounted on an interior side of the vehicle connected to the center pillar.

3. A seat belt mount mechanism of a seat belt for use in an automotive vehicle, comprising a fixing bracket connected to a door sash element of a vehicle body of an interior side of said vehicle body; an anchor plate mounted to said door sash element by screws connecting said anchor plate to said fixing bracket, said anchor plate including an elongated portion extending outwardly from a lower end of said anchor plate; a shoulder belt anchor including an opening for holding a shoulder seat belt, said anchor plate including a base and an engagement portion having a substantially U-shaped cross section extending away from said base, said engagement portion of substantially U-shaped cross section having an opening formed in a center thereof; a shoulder belt support bracket secured on an interior side of the vehicle by screws connected to a center pillar of said vehicle, said shoulder bracket having a portion extending beyond said center pillar toward said door sash for extending into said opening when the door of the vehicle is closed.

* * * * *